United States Patent

Miyazawa

(10) Patent No.: US 9,827,672 B2
(45) Date of Patent: Nov. 28, 2017

(54) PIEZOELECTRIC DRIVE DEVICE, DRIVING METHOD THEREOF, ROBOT, AND DRIVING METHOD THEREOF

(71) Applicant: Seiko Epson Corporation, Tokyo (JP)

(72) Inventor: Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/043,676

(22) Filed: Feb. 15, 2016

(65) Prior Publication Data

US 2016/0284968 A1 Sep. 29, 2016

(30) Foreign Application Priority Data

Mar. 25, 2015 (JP) ................................ 2015-062226

(51) Int. Cl.
| | |
|---|---|
| *B25J 9/16* | (2006.01) |
| *B25J 9/12* | (2006.01) |
| *B25J 9/00* | (2006.01) |
| *H02N 2/00* | (2006.01) |
| *H02N 2/10* | (2006.01) |
| *H02N 2/14* | (2006.01) |

(52) U.S. Cl.
CPC ............ *B25J 9/1633* (2013.01); *B25J 9/0087* (2013.01); *B25J 9/12* (2013.01); *H02N 2/0015* (2013.01); *H02N 2/103* (2013.01); *H02N 2/108* (2013.01); *H02N 2/14* (2013.01); *G05B 2219/41251* (2013.01); *G05B 2219/42289* (2013.01)

(58) Field of Classification Search
CPC ...................................................... B25J 9/0087
See application file for complete search history.

(56) References Cited

U.S. PATENT DOCUMENTS 6,304,835 B1 * 10/2001 Hiramatsu ............... G06G 7/64
    703/7
6,664,714 B2 * 12/2003 Magnussen ......... H01L 41/0906
    310/323.16

(Continued)

FOREIGN PATENT DOCUMENTS

| JP | 2004-320979 A | 11/2004 |
|---|---|---|
| JP | 2013-031288 A | 2/2013 |

*Primary Examiner* — Shawki S Ismail
*Assistant Examiner* — Muhammad S Islam
(74) *Attorney, Agent, or Firm* — Harness, Dickey & Pierce, P.L.C.

(57) ABSTRACT

A piezoelectric drive device includes a piezoelectric drive portion which includes a contact portion capable of coming into contact with a driven body and a piezoelectric material, and a drive circuit which drives the piezoelectric drive portion. The drive circuit sets an allowable maximum output torque Tlim or less to an allowable output torque range, sets output torque Td of the piezoelectric drive portion so as to be within the allowable output torque range, and operates the piezoelectric drive portion. The allowable maximum output torque Tlim is expressed by the following Expression (1).

$$Tlim = r1 \times \mu k \times Ns \times fs \qquad (1)$$

In the expression, r1 is a distance between a rotation center of the driven body and a contact position of the contact portion, µk is a dynamic friction coefficient between the driven body and the contact portion, Ns is a pressing force by which the contact portion presses the driven body when an operation of the piezoelectric drive portion stops, and fs is a coefficient of 1 or less.

6 Claims, 9 Drawing Sheets

(56) References Cited

U.S. PATENT DOCUMENTS

| | | | |
|---|---|---|---|
| 8,324,786 B2* | 12/2012 | Kim | G06F 3/016 |
| | | | 310/328 |
| 2004/0256956 A1 | 12/2004 | Miyazawa | |
| 2012/0048027 A1* | 3/2012 | Hashiguchi | B25J 9/0087 |
| | | | 73/763 |
| 2012/0316675 A1* | 12/2012 | Urano | B25J 15/0009 |
| | | | 700/245 |

* cited by examiner

PIEZOELECTRIC DRIVE DEVICE, DRIVING METHOD THEREOF, ROBOT, AND DRIVING METHOD THEREOF

BACKGROUND

1. Technical Field

The present invention relates to a piezoelectric drive device and a driving method thereof, and a robot and a driving method thereof.

2. Related Art

Since a piezoelectric actuator (piezoelectric drive device), which vibrates a piezoelectric material and drives a driven body, does not require a magnet or a coil, the piezoelectric actuator is used in various fields (for example, JP-A-2004-320979). A basic configuration of the piezoelectric drive device is as follows. That is, four piezoelectric elements are configured so as to be disposed 2×2 on each of two surfaces of a reinforcing plate, and a total of eight piezoelectric elements are provided on both sides of the reinforcing plate. Each piezoelectric element is a unit in which the piezoelectric material is interposed between two electrodes, and the reinforcing plate is used as one electrode of the piezoelectric element. A protrusion portion, which comes into contact with a rotor serving as the driven body to rotate the rotor, is provided on one end of the reinforcing plate. When an alternating voltage is applied to two piezoelectric elements which are diagonally disposed among four piezoelectric elements, the two piezoelectric elements perform expansion and contraction movements. Accordingly, the protrusion portion of the reinforcing plate performs a reciprocating movement or an elliptical movement. In addition, the rotor serving as the driven body rotates in a predetermined rotation direction according to the reciprocating movement or the elliptical movement of the protrusion portion of the reinforcing plate. In addition, by switching the application target of the alternating voltage from the two piezoelectric elements to the other two piezoelectric elements, it is possible to rotate the rotor in a reverse direction.

In an operating device (robot or the like) to which the piezoelectric drive device is applied, in a state where a movement of an operating portion stops, the protrusion portion presses the driven body. Accordingly, a static friction force generated between the protrusion portion and the driven body becomes a holding force or holding torque for holding the operating portion connected to the driven body in a stationary state. Therefore, if an external force exceeding the holding force is applied to the operating portion, the stationary state of the driven body cannot be held, and the operating portion moves.

In addition, during the operation of the operating portion, the piezoelectric drive device generates output torque exceeding the holding torque by a great pressing force which is generated by the movement (elliptical movement or the like) of the protrusion portion. Accordingly, the operating portion connected to the driven body is operated. In addition, when the movement of the operating portion is decelerated, apparent output torque increases due to an inertial force. Since output torque greater than the holding torque is generated, it is possible to move the operating portion by load torque greater than the holding force. However, there is a problem that the moment the movement of the operating portion stops, the operating portion moves in a direction opposite to the movement direction immediately before the operating portion stops, and the operating portion cannot be stopped at a desired position.

In addition, during the operation of the operating portion, in a case where the holding torque and the output torque antagonize each other, if slight sliding is temporarily generated between the protrusion portion and the driven body, since the operating portion is changed from a stationary friction state to a dynamic friction state and the friction force decreases, there is a problem that the operating portion continuously slides without being stopped and cannot be stopped. Accordingly, a technology capable of stopping the operating portion at a desired position after the movement of the operating portion starts and moving the piezoelectric drive device so as to hold the stationary state at the desired position is required.

SUMMARY

An advantage of some aspects of the invention is to solve at least a part of the problems described above, and the invention can be implemented as the following forms or application examples.

(1) An aspect of the invention provides a piezoelectric drive device. The piezoelectric drive device includes a piezoelectric drive portion which includes a contact portion capable of coming into contact with a driven body and a piezoelectric material, and a drive circuit which drives the piezoelectric drive portion. The drive circuit sets an allowable maximum output torque Tlim or less to an allowable output torque range, sets output torque Td of the piezoelectric drive portion so as to be within the allowable output torque range, and operates the piezoelectric drive portion. The allowable maximum output torque Tlim is expressed by the following Expression (1).

$$Tlim = r1 \times \mu k \times Ns \times fs \qquad (1)$$

In the expression, r1 is a distance between a rotation center of the driven body and a contact position of the contact portion, μk is a dynamic friction coefficient between the driven body and the contact portion, Ns is a pressing force by which the contact portion presses the driven body when an operation of the piezoelectric drive portion stops, and fs is a coefficient of 1 or less.

According to this aspect, the output torque Td of the piezoelectric drive device is set so as to be within the allowable output torque range of the allowable maximum output torque Tlim or less, and it is possible to drive the piezoelectric drive portion. In this case, load torque applied to the driven body is the output torque Td or less. Accordingly, unlike the related art, since the driven body is not operated at load torque greater than the holding torque, it is possible to stop the driven body at a desired position. In addition, the allowable maximum output torque Tlim is smaller than holding torque (r1×μs×Ns, μs is a stationary friction coefficient between the driven body and the contact portion) by which the driven body is held in a stationary state. Accordingly, unlike the related art, it is possible to prevent occurrence of sliding between the contact portion and the driven body.

(2) In the piezoelectric drive device of the aspect, the coefficient fs may be a value less than 1.

According to this aspect, since the upper limit value of the allowable output torque range can be set so as to be lowered and the upper limit value of the settable output torque can be limited, it is possible to more reliably stop the driven body at a desired position, and it is possible to more reliably prevent occurrence of sliding between the contact portion and the driven body.

(3) In the piezoelectric drive device of the aspect, load torque applied to the driven body may be limited to less than or equal to output torque which is set to the allowable maximum output torque Tlim or less. The load torque applied to the driven body may be limited so as to be the allowable maximum output torque Tlim or less.

According to this aspect, it is possible to stop the driven body to which the load torque is applied at a desired position, and it is possible to prevent the occurrence of sliding between the contact portion and the driven body.

The invention can be implemented in various forms. For example, the invention can be implemented as various forms such as a driving method of the piezoelectric drive device, a manufacturing method of the piezoelectric drive device, a robot on which the piezoelectric drive device is mounted, a driving method of the robot on which the piezoelectric drive device is mounted, an electronic component transport device, a liquid feeding pump, or a dosing pump, in addition to the piezoelectric drive device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Double-Arm Robot of Embodiment

Figure 1:
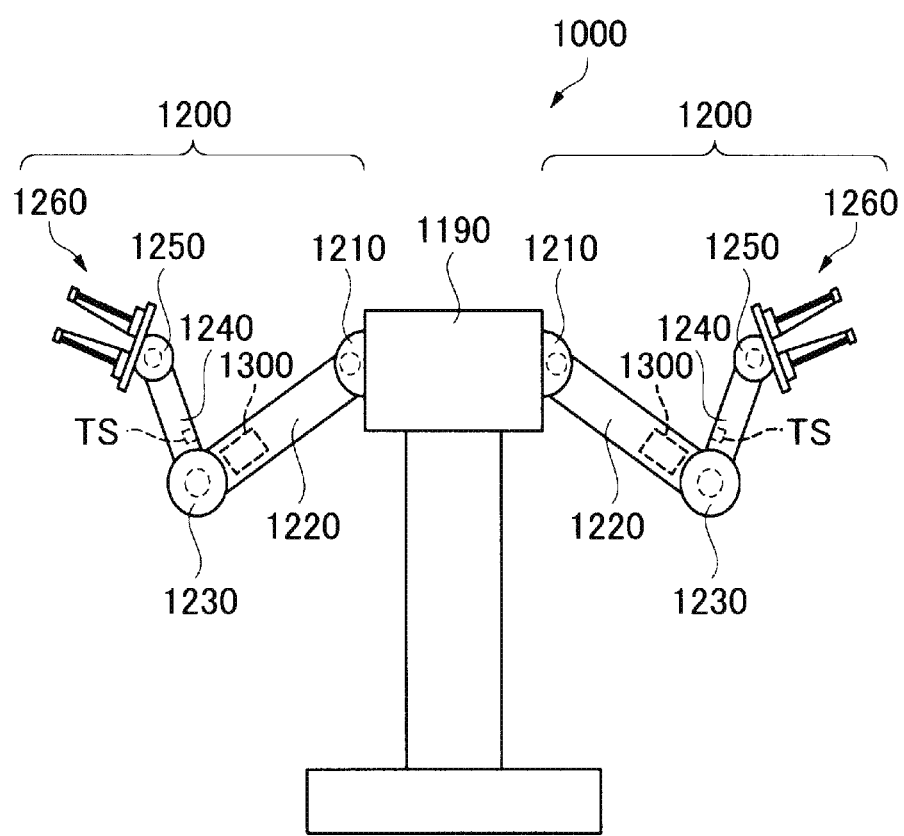
FIG. 1 is a schematic front view showing a structure of a double-arm robot including a piezoelectric drive device according to an embodiment of the invention.

FIG. 1 is a schematic front view showing a structure of a double-arm robot 1000 including a piezoelectric drive device 1300 according to an embodiment of the invention. As shown in FIG. 1, the double-arm robot 1000 includes a main body portion 1190. In addition, a pair of arm portions 1200 which is connected to the main body portion 1190 is installed. In each arm portion 1200, a shoulder joint portion 1210, a first link portion 1220, an elbow joint portion 1230, a second link portion 1240, a wrist joint portion 1250, and a robot hand 1260 are installed in this order from the main body portion 1190 side. The piezoelectric drive device 1300, which rotates the elbow joint portion 1230 to rotate the second link portion 1240 with respect to the first link portion 1220, is installed on the elbow joint portion 1230 side of the first link portion 1220. In addition, similarly, the piezoelectric drive device for rotating the other joint portion is installed in the other joint portion. However, since the movement of any piezoelectric drive device is substantially similar to that of the piezoelectric drive device 1300, hereinafter, the piezoelectric drive device 1300 is described as a representative example.

Figure 2:
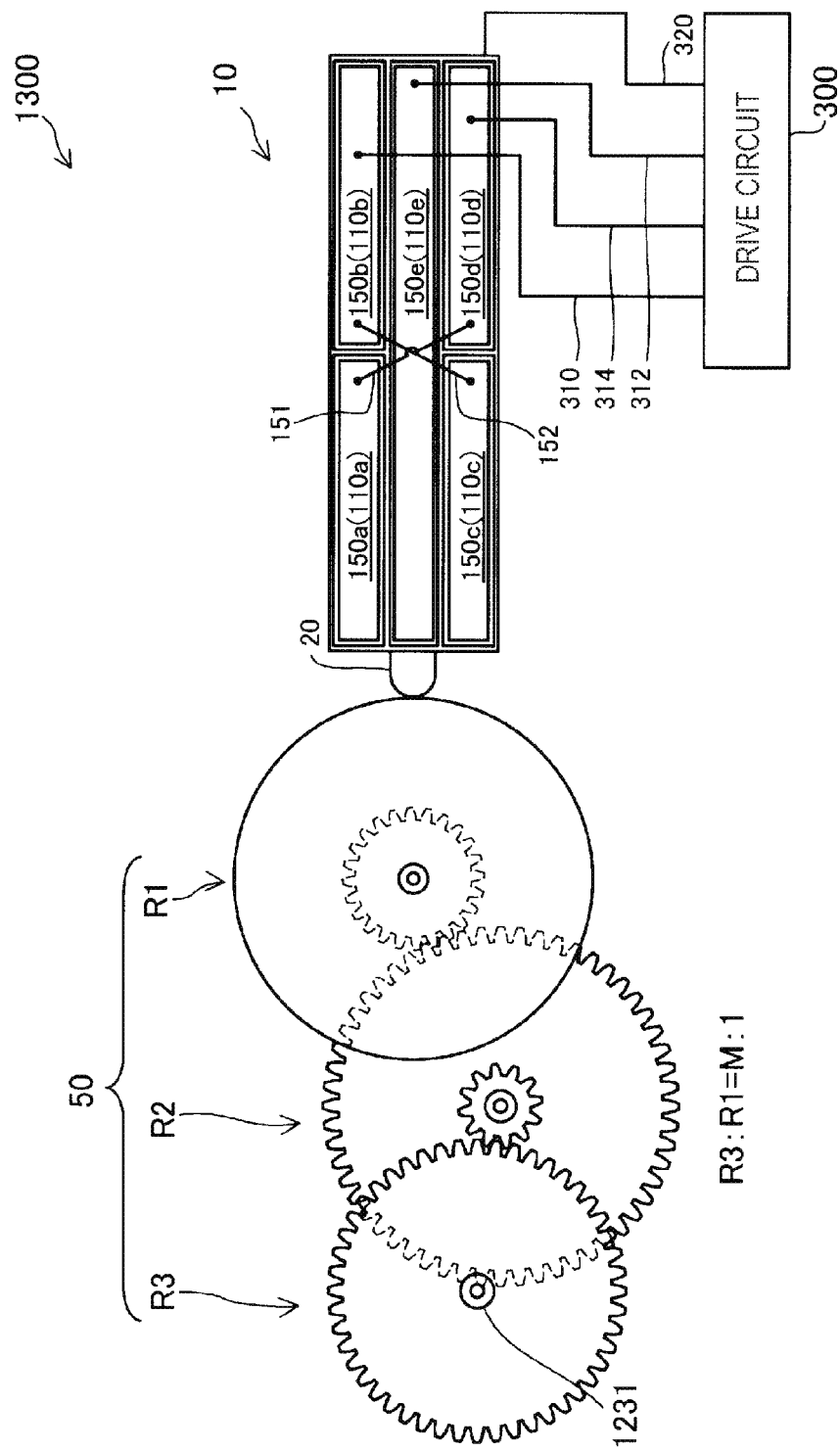
FIG. 2 is a schematic configuration view showing an example of the piezoelectric drive device.

FIG. 2 is a schematic configuration view showing an example of the piezoelectric drive device 1300. The piezoelectric drive device 1300 includes a piezoelectric drive portion 10 which drives a rotor R1 which is included in a gear train 50 and is a driven body, and a drive circuit 300 which drives the piezoelectric drive portion 10.

The gear train 50 includes a first rotor R1 which is the driven body driven (rotated) by the piezoelectric drive portion 10, a second rotor R2 which is rotated by the first rotor R1, and a third rotor R3 which is rotated by the second rotor R2. The gear train 50 is a deceleration device in which a gear ratio (change gear ratio) between the first rotor R1 and the third rotor R3 is 1:M (M>1). Hereinafter, the gear ratio M of the third rotor R with respect to the first rotor R1 is also referred to as a "reduction gear ratio M". The third rotor R3 is concentrically connected to a rotation shaft 1231 of the elbow joint portion 1230 (FIG. 1). Accordingly, when the first rotor R1 is rotated by the piezoelectric drive portion 10, according to this rotation, the third rotor R3 is rotated at the reduction gear ratio M. Therefore, the elbow joint portion 1230 is rotated via the rotation shaft 1231 according to the rotation of the third rotor R3, and the second link portion 1240 rotates with respect to the first link portion 1220 according to the rotation of the elbow joint portion 1230.

Figure 3A:
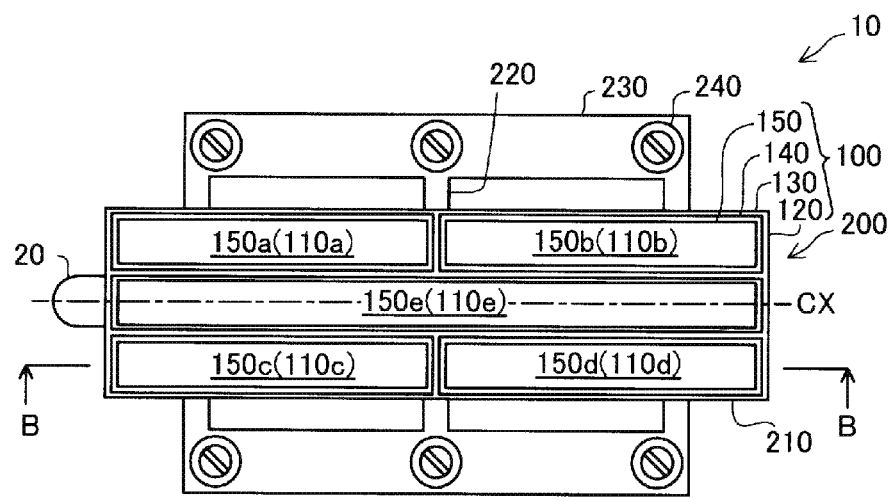
FIGS. 3A and 3B are schematic configuration views of a piezoelectric drive portion.
Figure 3B:
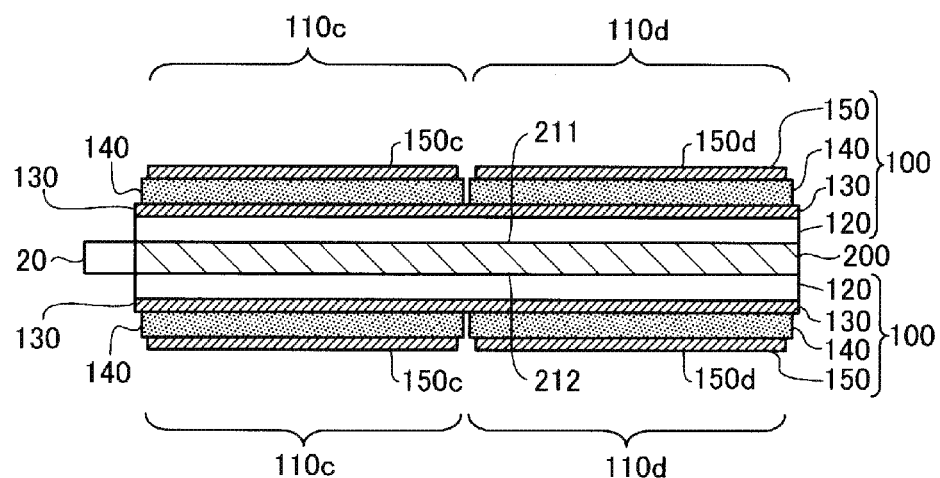

FIGS. 3A and 3B are schematic configuration views of the piezoelectric drive portion 10. FIG. 3A is a plan view of the piezoelectric drive portion 10, and FIG. 3B is a sectional view taken along Line B-B. The piezoelectric drive portion 10 includes a vibrating plate 200, and two piezoelectric vibrating bodies 100 which are respectively disposed on both surfaces (first surface 211 and second surface 212) of the vibrating plate 200. The piezoelectric vibrating body 100 includes a substrate 120, a first electrode 130 which is formed on the substrate 120, a piezoelectric material 140 which is formed on the first electrode 130, and a second electrode 150 which is formed on the piezoelectric material 140. The piezoelectric material 140 is interposed between the first electrode 130 and the second electrode 150. The two piezoelectric vibrating bodies 100 are symmetrically disposed with respect to the vibrating plate 200. Since the two piezoelectric vibrating bodies 100 have the same configuration as each other, hereinafter, unless otherwise mentioned, the configuration of the piezoelectric vibrating body 100 positioned on the upper side of the vibrating plate 200 is described.

The substrate 120 of the piezoelectric vibrating body 100 is used as a substrate for forming the first electrode 130, the piezoelectric material 140, and the second electrode 150 in a film forming process. In addition, the substrate 120 also has a function severing as a vibrating plate which performs mechanical vibrations. For example, the substrate 120 may be formed of Si, $Al_2O_3$, $ZrO_2$, or the like. For example, as the substrate 120 which is formed of Si, a Si wafer for manufacturing a semiconductor may be used. In this embodiment, the planar shape of the substrate 120 is a rectangular shape. For example, preferably, a thickness of the substrate 120 is within a range from 10 μm to 100 μm. If the thickness of the substrate 120 is 10 μm or more, it is possible to relatively easily handle the substrate 120 when film forming processing is performed on the substrate 120. In addition, if the thickness of the substrate 120 is 100 μm or less, it is possible to easily vibrate the substrate 120 according to expansion and contraction of the piezoelectric material 140 which is thinly formed.

The first electrode 130 is formed of a single continuous conductor layer which is formed on the substrate 120. Meanwhile, as shown in FIG. 3A, the second electrode 150 is divided into five conductor layers 150a to 150e (also referred to as "second electrodes 150a to 150e). The second electrode 150e positioned at the center is formed in a rectangular shape over the entire substrate 120 in a longitudinal direction of the substrate 120 in the center in a width direction of the substrate 120. The second other four electrodes 150a, 150b, 150c, and 150d have the same planar shape as one another, and are formed at four corner positions of the substrate 120. In examples of FIGS. 3A and 3B, both the first electrode 130 and the second electrode 150 have rectangular planar shapes. For example, the first electrode 130 or the second electrode 150 is a thin film which is formed by sputtering. As a material of the first electrode 130 or the second electrode 150, for example, a material having high conductivity such as aluminum (Al), nickel (Ni), gold (Au), platinum (Pt), or iridium (Ir) may be arbitrarily used. In addition, instead of the single continuous conductor layer, the first electrode 130 may be divided into five conductor layers having substantially the same planar shapes as those of the second electrodes 150a to 150e. In addition, wires (wire layers and insulating layers) for electrically connecting portions between the second electrodes 150a to 150e, and wires (wire layers or insulating layers) for electrically connecting portions between the first electrode 130 and the second electrodes 150a to 150e and the drive circuit are not shown in FIGS. 3A and 3B.

The piezoelectric material 140 is formed of five piezoelectric layers which have substantially the same shapes as those of the second electrodes 150a to 150e. Instead of this, the piezoelectric material 140 may be formed of a single continuous piezoelectric layer having substantially the same planar shape as that of the first electrode 130. According to a lamination structure of the first electrode 130, the piezoelectric material 140, and the second electrodes 150a to 150e, five piezoelectric elements 110a to 110e (FIG. 3A) are configured. Four piezoelectric elements 110a to 110d among the five piezoelectric elements 110a to 110e are divided into a first pair of diagonal piezoelectric elements 110a and 110d, and a second pair of diagonal piezoelectric elements 110b and 110c, and the pairs of piezoelectric elements 110a to 110d are positioned horizontally and symmetrically with respect to a center line CX along a longitudinal direction of the piezoelectric vibrating body 100. The remaining piezoelectric element 110e is interposed between the pair of piezoelectric elements 110a and 110d and the other pair of piezoelectric elements 110b and 110c, and is positioned at the center in the width direction of the piezoelectric vibrating body 100 along the center line CX. In addition, hereinafter, the pair of piezoelectric elements 110a and 110d is referred to as a "first piezoelectric elements 110a and 110d, and the other pair of piezoelectric elements 110b and 110c is referred to as a "second piezoelectric elements 110b and 110c". In addition, the central piezoelectric element 110e is referred to as a "third piezoelectric element 110e".

For example, the piezoelectric material 140 is a thin film which is formed using a sol-gel method or a sputtering method. As a material of the piezoelectric material 140, any material having piezoelectric effects such as ceramics adopting an $ABO_3$ type Perovskite structure may be used. For example, the ceramics adopting the $ABO_3$ type Perovskite structure may use lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, lead niobate scandium, or the like. In addition, as a material having piezoelectric effects in addition to the ceramics, there is polyvinylidene fluoride, crystal, or the like. For example, preferably, a thickness of the piezoelectric material 140 is within a range from 50 nm (0.05 μm) to 20 μm. The thin film of the piezoelectric material 140 having the thickness of the range can be easily formed using a film forming process. If the thickness of the piezoelectric material 140 is 0.05 μm or more, it is possible to generate a sufficient force according to the expansion and the contraction of the piezoelectric material 140. In addition, if the thickness of the piezoelectric material 140 is 20 μm or less, it is possible to sufficiently decrease a size of the piezoelectric vibrating body 100 (piezoelectric drive portion 10).

Figure 4:
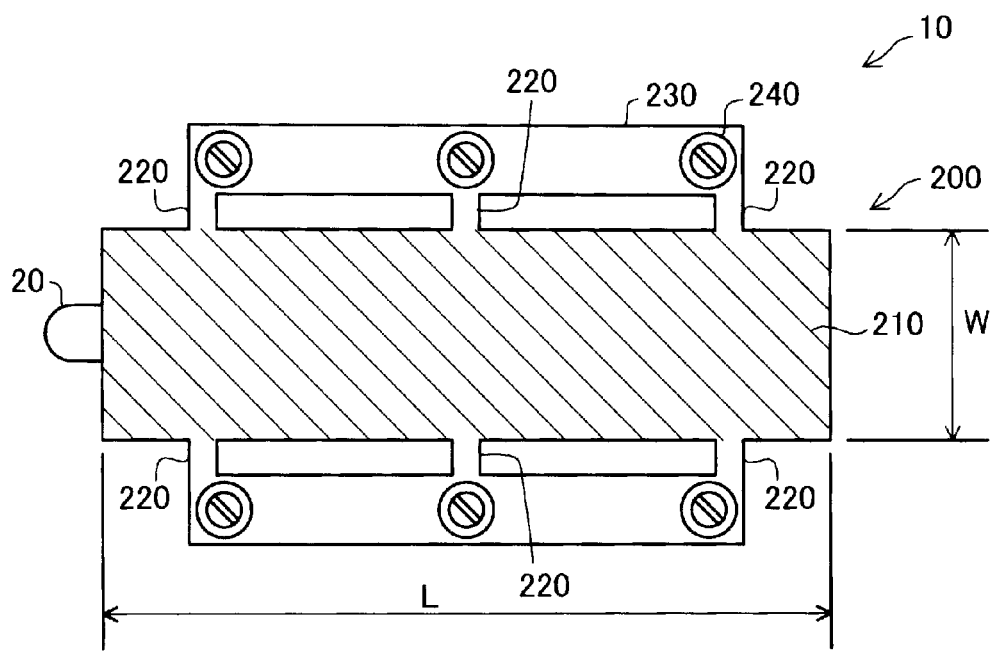
FIG. 4 is a plan view of a vibrating plate.

FIG. 4 is a plan view of the vibrating plate 200. The vibrating plate 200 includes a rectangular vibrator portion 210, three connection portions 220 which extend from each of long right and left sides of the vibrator portion 210, and two attachment portions 230 which are connected to three right connection port ions 220 and three left connection portions 220. In addition, for easy illustration, in FIG. 4, the vibrator portion 210 is hatched. The attachment portion 230 is used to attach the piezoelectric drive portion 10 to other members using screws 240. For example, the vibrating plate 200 may be formed of materials such as metal of silicon, silicon compound, stainless steel, aluminum, aluminum alloy, titanium, titanium alloy, copper, copper alloy, iron-nickel alloy, or the like, metal oxide, or diamond.

The piezoelectric vibrating body 100 (FIGS. 3A and 3B) is adhered to each of the upper surface (first surface) and the lower surface (second surface) of the vibrator portion 210 using an adhesive agent. Preferably, a ratio between a length L and a width W of the vibrator portion 210 is set so as to satisfy L:W=approximately 7:2. This ratio is a value which is preferable to perform ultrasonic vibrations (described below) by which the vibrator portion 210 is bent right and left along the plane thereof. For example, the length L of the vibrator portion 210 may be within a range from 0.1 mm to 30 mm, and for example, the width W of the vibrator portion 210 may be within a range from 0.05 mm to 8 mm. In addition, preferably, the length L of the vibrator portion 210 is set so as to be 50 mm or less so that the vibrator portion 210 performs the ultrasonic vibrations. For example, the thickness of the vibrator portion 210 (the thickness of the vibrating plate 200) may be within a range from 20 μm to 700 μm. If the thickness of the vibrator portion 210 is 20 μm or more, it is possible to obtain sufficient stiffness for supporting the piezoelectric vibrating body 100. In addition, if the thickness of the vibrator portion 210 is 700 μm or less, it is possible to generate sufficient deformation according to deformation of the piezoelectric vibrating body 100.

A protrusion portion 20 (also referred to as a "contact portion, an "abutment portion", or an "operating portion") is provided on one short side of the vibrating plate 200. The protrusion portion 20 is a member which comes into contact with the driven body to apply a force to the driven body. Preferably, the protrusion portion 20 is formed of a material having durability such as ceramics (for example, Si, SiC, $Al_2O_3$, $ZrO_2$).

As shown in FIG. 2, among the five second electrodes 150a to 150e of the piezoelectric drive portion 10, the pair of second electrodes 150a and 150d diagonally positioned to each other is electrically connected to each other via a wire 151, and the other pair of second electrodes 150b and 150c diagonally positioned to each other is electrically connected to each other via a wire 152. The wires 151 and 152 may be formed using film forming processing, or may be realized by wire-shaped wiring. The second three electrodes 150b, 150e, and 150d positioned at the right of FIG. 2, and the first electrode 130 (FIGS. 3A and 3B) are electrically connected to the drive circuit 300 via wires 310, 312, 314, and 320. The drive circuit 300 applies alternating voltages or pulsating voltages which are periodically changed to the portions between the pair of second electrodes 150a and 150d, and the first electrode 130. Accordingly, the piezoelectric drive portion 10 is subjected to ultrasonic vibrations, and the rotor (driven body) which comes into contact with the protrusion portion 20 can rotate in a predetermined rotation direction. Here, the "pulsating voltage" means a voltage in which DC offset is added to the alternating voltage, and a direction of the voltage (electric field) is one direction from one electrode toward the other electrode. Moreover, alternating voltages or pulsating voltages are applied to the portions between the other pair of second electrodes 150b and 150c, and the first electrode 130. Accordingly, the rotor (driven body) which comes into contact with the protrusion portion 20 can rotate in the reverse direction. The voltages are simultaneously applied to two piezoelectric vibrating bodies 100 which are provided on both surfaces of the vibrating plate 200. In addition, wires (or wire layers and insulating layers) configuring the wires 151, 152, 310, 312, 314, and 320 shown in FIG. 2 are not shown in FIGS. 3A and 3B.

Figure 5:
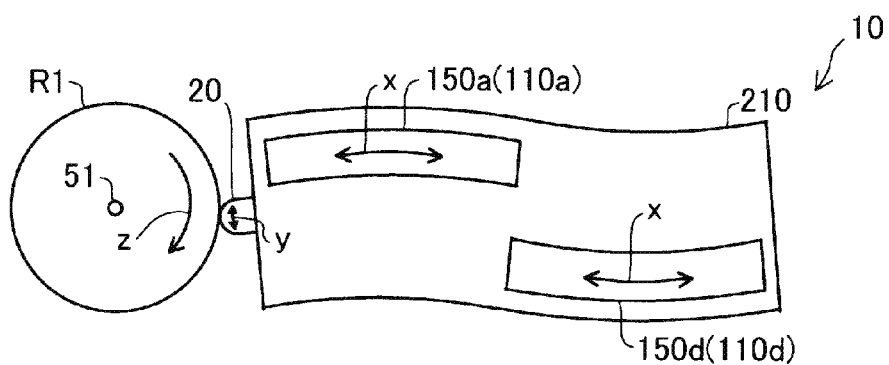
FIG. 5 is an explanatory view showing an example of a movement of the piezoelectric drive portion.

FIG. 5 is an explanatory view showing an example of the movement of the piezoelectric drive portion 10. The protrusion portion 20 of the piezoelectric drive portion 10 comes into contact with the outer circumference of the first rotor R1 serving as the driven body. In the example shown in FIG. 5, the drive circuit 300 (FIG. 2) applies alternating voltages or pulsating voltages to the portions between the pair of second electrodes 150a and 150d and the first electrode 130, and the first piezoelectric elements 110a and 110d are expanded and contracted in an arrow X direction of FIG. 5. Accordingly, the vibrator portion 210 of the piezoelectric drive portion 10 is bent in the plane of the piezoelectric vibrator portion 210 and is deformed in a meandering shape (S shape), and the tip of the protrusion portion 20 performs a reciprocating movement or an elliptical movement in an arrow y direction. As a result, the first rotor R1 rotates around a center 51 thereof in a predetermined direction z (a clockwise direction in FIG. 5). Three connection portions 220 of the vibrating plate 200 described in FIGS. 3A and 3B are provided at positions of nodes (knots) of the vibrations of the vibrator portion 210. In addition, when the drive circuit 300 applies alternating voltages or pulsating voltages to the portions between the other pair of second electrodes 150b and 150c and the first electrode 130, the first rotor R1 is rotated in the reverse direction. In addition, if the same voltages as those of the pair of second electrodes 150a and 150d (or the other pair of second electrodes 150b and 150c) are applied to the second center electrode 150e, since a component in which the third center piezoelectric element 110e is expanded and contracted in the longitudinal direction is applied to the movement of the piezoelectric drive portion 10, it is possible to increase a force applied from the protrusion portion 20 to the first rotor R1. In addition, the movement of the piezoelectric drive portion 10 (or the piezoelectric vibrating body 100) is described in the related art (JP-A-2004-320979 or US patent No. 7224102), and the content of which is incorporated herein for reference.

Figure 6:
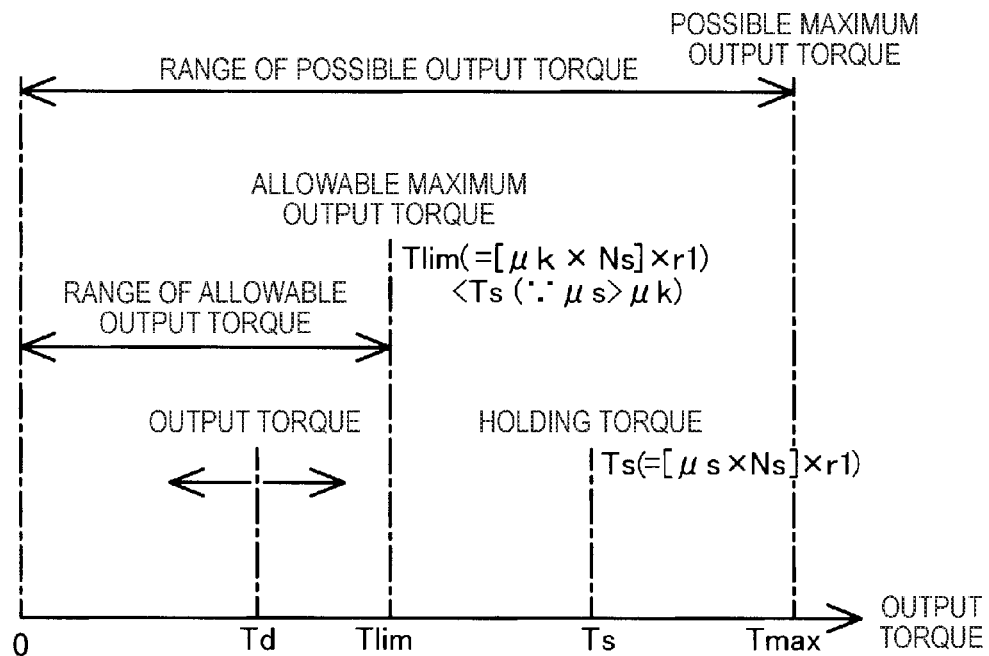
FIG. 6 is an explanatory view showing output torque which is allowed to the piezoelectric drive portion.

FIG. 6 is an explanatory view showing output torque which is allowed to the piezoelectric drive portion 10. A range of torque (possible output torque) which can be output by the piezoelectric drive portion 10 is a range of 0 to the maximum torque which can be output (hereinafter, also referred to as "possible maximum output torque") Tmax, and it is possible to substantially operate the piezoelectric drive portion 10 by the output torque Td within the range of the possible output torque.

Here, when driving of the piezoelectric drive portion 10 operated by the drive circuit 300 is stopped, the operation of the piezoelectric drive portion 10 is stopped in a state where the protrusion portion 20 comes into contact with the outer circumference of the first rotor R1 serving as the driven body (FIGS. 2 and 5). In this case, a holding force Fs and holding torque Ts for holding the first rotor R1 in a stationary state are generated on a contact surface between the protrusion portion 20 and the first rotor R1.

$$Fs = \mu s \times Ns \tag{2}$$

$$Ts = Fs \times r1 = [\mu s \times Ns] \times r1 \tag{3}$$

Here, Ns is a pressing force (hereinafter, also referred to as a "pressing force during a pause in operation") by which the protrusion portion 20 presses the first rotor R1 when the operation of the piezoelectric drive portion 10 stops, μs is a stationary friction coefficient between the protrusion portion 20 and the first rotor R1, and r1 is a radius of the first rotor R1 (hereinafter, also referred to as a "rotor radius").

As expressed by Expression (3), the holding torque Ts is changed according to the static friction coefficient μs and the pressing force Ns during a pause in operation within a range which is less than or equal to the maximum torque (possible maximum output torque) Tmax which can be output by the piezoelectric drive portion 10. For example, the static friction coefficient μs is changed according to the members of the first rotor R1 and the protrusion portion 20, and when the static friction coefficient μs decreases, the holding torque Ts decreases according to the decrease of the static friction coefficient μs. In addition, the pressing force Ns during a pause in operation is changed according to installation states of the first rotor R1 and the piezoelectric drive portion 10, and the holding force Ts decreases as the pressing force Ns during a pause in operation decreases. Consequently, when load torque Tr applied from the elbow joint portion 1230 to the first rotor R1 via the third rotor R3 and the second rotor R2 is the holding torque Ts or more, the first rotor R1, that is, the elbow joint portion 1230 cannot hold the stationary state without changing the posture. Conversely, preferably, the load torque Tr applied to the first rotor is less than the holding torque Ts. That is, preferably, the load torque generated by the load applied to the second link portion 1240 side of the elbow joint portion 1230 is limited so as to be less than a value Ts*M which is obtained by multiplying the holding torque Ts by the reduction gear ratio M. Here, the "reduction gear ratio M" is gear ratio of the rotor which is concentrically connected to a rotation shaft of a load portion which is driven via the driven body with respect to the rotor serving as the driven body of the piezoelectric drive portion 10 (refer to FIG. 2). In addition, in this example, the rotor serving as the driven body is the first rotor R1, the load portion is the robot hand 1260, the wrist joint portion 1250, and the elbow joint portion 1230 to which the second link portion 1240 is connected, and the rotation shaft of the load portion is the rotation shaft 1231.

In general, it is satisfied that static friction coefficient μs>dynamic friction μk. Accordingly, preferably, a maximum output torque (allowable maximum output torque) Tlim allowable as the output torque Td of the piezoelectric drive portion 10 is obtained by the following Expression.

$$Tlim=[\mu k \times Ns] \times r1 \quad (4)$$

Here, μk is the dynamic friction coefficient, Ns is the pressing force during a pause in operation, and r1 is the first rotor radius r1.

Since it is not possible to operate the load of the load torque equal to or more than the set output torque Td, the load torque Tr corresponding to the load applied to the first rotor R1 is less than or equal to the output torque Td. In addition, the maximum value of the set output torque Td is the allowable maximum output torque Tlim, and allowable maximum output torque Tlim<holding torque Ts is satisfied from the relationship of dynamic friction coefficient μk<static friction coefficient μs. Accordingly, it is possible to necessarily set the load torque Tr, which can be operated by the set output torque Td, so as to be lower than the holding force Ts. Therefore, it is possible to limit the load torque Tr so that the load torque Tr is not operated by the output torque Td equal to or more than the holding torque Ts. As a result, when the operation of the piezoelectric drive portion 10 stops from the state where the elbow joint portion 1230 is driven by the piezoelectric drive portion 10, and the rotation of the first rotor R1, that is, the rotation of the elbow joint portion 1230 stops, it is possible to stop the rotation of the first rotor R1, that is, the rotation of the elbow joint portion 1230 at a desired position without being operated in a reverse direction the moment the rotor R1 stops. Moreover, it is possible to hold the first rotor R1 in a stationary state at stopped position by the holding torque Ts without generating sliding between the protrusion portion 20 and the first rotor R1.

In addition, for example, setting of the output torque Td is performed in advance as follows at the time of adjustment for shipping. In the piezoelectric drive device 1300 of the elbow joint portion 1230, the load torque applied to the elbow joint portion 1230 is measured by a torque sensor Ts which is bonded to the second link portion 1240 shown in FIG. 1. However, the maximum load which can be held is measured in a state where the holding is maintained by the robot hand 1260. In addition, a value which is obtained by multiplying the measured load torque by 1/M (M is the reduction gear ratio) is obtained as the maximum load torque Tr applied to the first rotor R1, and the output torque Td corresponding to the obtained load torque Tr may be set so as to be within the allowable output torque range. When the load torque Tr is greater than the allowable maximum output torque Tlim, by adjusting the contact state between the protrusion portion 20 of the piezoelectric drive portion 10 and the first rotor R1, the pressing force Ns during a pause in operation increases, and the load torque Tr may be adjusted so as to be less than or equal to the allowable maximum output torque Tlim.

In the above descriptions, the output torque Td of the piezoelectric drive portion 10 is set so as to be within the allowable output torque range from 0 to the allowable maximum output torque Tlim, and Expression (4) is used with respect to the allowable maximum output torque Tlim. Meanwhile, the allowable maximum output torque Tlim may be expressed by the following Expression (5).

$$Tlim=[\mu k \times Ns] \times r1 \times fs \quad (5)$$

Here, fs is a coefficient less than or equal to 1 and indicates a safety factor. When fs=1 is satisfied, Expression (5) is the same as Expression (4). Since the allowable maximum output torque Tlim decreases as the coefficient fs decreases, the load torque Tr corresponding to the set output torque Td also decreases, and more specifically, when the operation of the piezoelectric drive portion 10 stops from the state where the elbow joint portion 1230 is driven by the piezoelectric drive portion 10, it is possible to stop the elbow joint portion 1230 at a desired position and hold a stationary state of the elbow joint portion 1230 at the stopped position. However, the load which can be operated decreases as the safety factor fs decreases. In addition, preferably, fs is set so as to be within a range of 7/10 to 9/10. For example, more preferably, fs is set to 8/10 (=4/5).

Moreover, in the above descriptions, the examples of the movement conditions of the piezoelectric drive portion 10 of the piezoelectric drive device 1300 in the elbow joint portion 1230 are described. However, the movement conditions may be similarly set to the piezoelectric drive portion of the piezoelectric drive device which is used in other joint portions or the like. In addition, in the above descriptions, since the protrusion portion 20 of the piezoelectric drive portion 10 comes into contact with the outer circumference of the first rotor R1, in the holding torque Ts expressed by Expression (4) or the allowable maximum output torque Tlim expressed by Expressions (5) and (6), the first rotor radius r1 is used. However, when the protrusion portion 20 comes into contact with the outer circumferential surface of the first rotor R1, the distance from the center 51 of the first rotor R1 to the contact position of the protrusion portion 20 becomes the distance r1.

B. Other Embodiments of Piezoelectric Drive Portion

Figure 7:
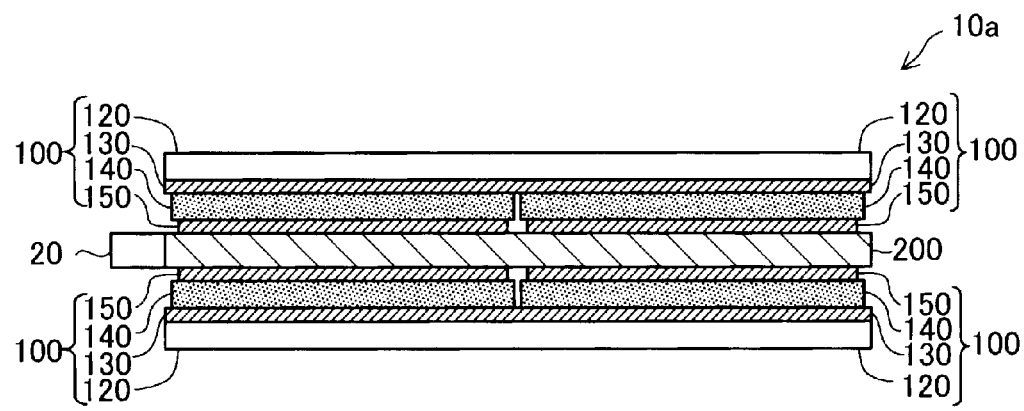
FIG. 7 is a section view of a piezoelectric drive portion which is another embodiment of the invention.

FIG. 7 is a sectional view of a piezoelectric drive portion 10a which is another embodiment of the invention, and is a view corresponding to FIG. 3B of the above-described embodiment. In the piezoelectric drive portion 10a, in a state where the top and the bottom of the piezoelectric vibrating body 100 of FIG. 3B are reversed, the piezoelectric vibrating body 100 is disposed on the vibrating plate 200. That is, here, the second electrode 150 is disposed so as to be close to the vibrating plate 200, and the substrate 120 is disposed so as to be farthest from the vibrating plate 200. In addition, similar to FIG. 3B, also in FIG. 7, the wires (wire layers and insulating layers) for electrically connecting portions between the second electrodes 150a to 150e, and wires (wire layers or insulating layers) for electrically connecting portions between the first electrode 130 and the second electrodes 150a to 150e and the drive circuit are not shown. According to this piezoelectric drive portion 10a, it is possible to achieve effects similar to those of the first embodiment.

Figure 8A:
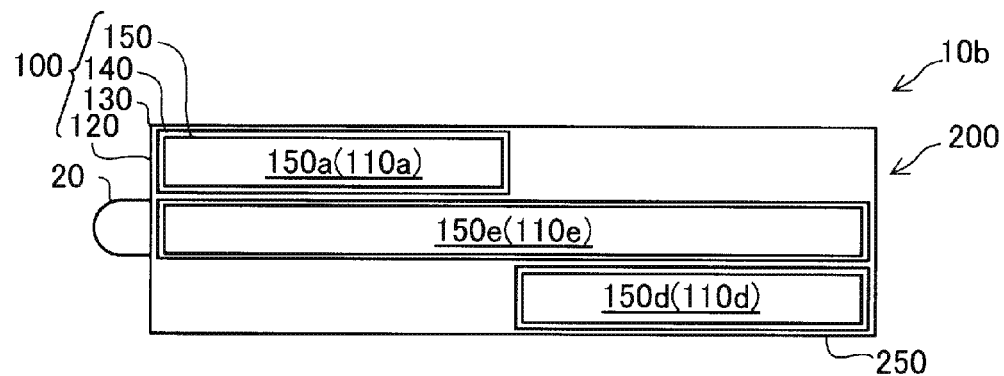
FIGS. 8A to 8C are plan views of a piezoelectric drive portion which is still another embodiment of the invention.
Figure 8B:
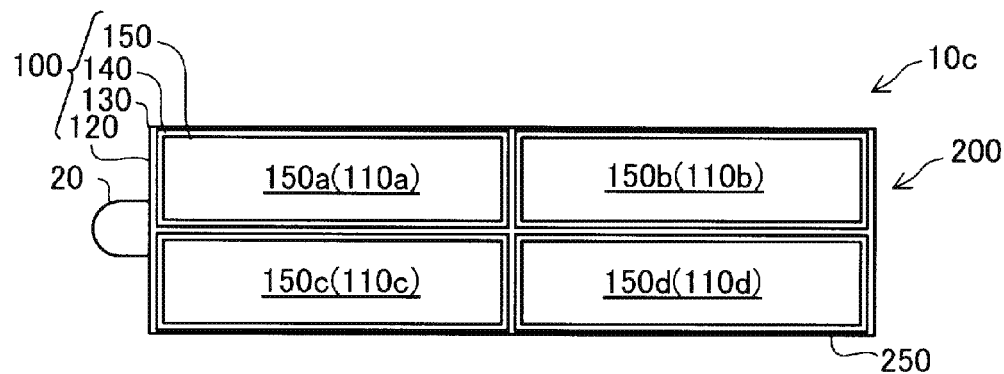

FIG. 8A is a plan view of a piezoelectric drive portion 10b which is still another embodiment of the invention, and is a view corresponding to FIG. 3A of the above-described embodiment. In FIGS. 8A to 8B, for easy illustration, the connection portion 220 or the attachment portion 230 of the vibrating plate 200 is not shown. In the piezoelectric drive portion 10b of FIG. 8A, the pair of second electrodes 150b and 150c is omitted. This piezoelectric drive portion 10b can also rotate the rotor R1 in one direction z as shown in FIG. 5. In addition, since the same voltage is applied to the second three electrodes 150a, 150e, and 150d of FIG. 8A, the second three electrodes 150a, 150e, and 150d may be formed of a single continuous electrode layer.

FIG. 8B is a plan view of a piezoelectric drive portion 10c of still another embodiment of the invention. In this piezoelectric drive portion 10c, the second center electrode 150e of FIG. 3A is omitted, and the second other four electrodes 150a, 150b, 150c, and 150d are formed so as to have larger areas than those of FIG. 3A. According to this piezoelectric drive portion 10c, it is possible to achieve effects similar to those of the first embodiment.

Figure 8C:
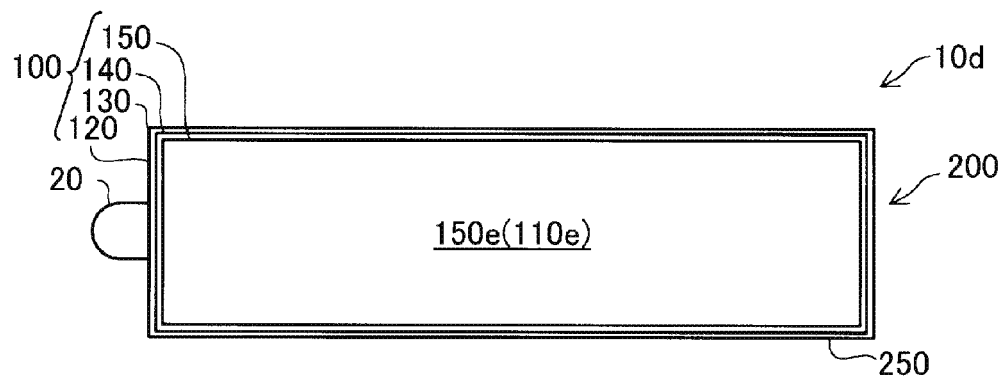

FIG. 8C is a plan view of a piezoelectric drive portion 10d of still another embodiment of the invention. In this piezoelectric drive portion 10d, the second four electrodes 150a, 150b, 150c, and 150d of FIG. 3A are omitted, and the second single electrode 150e is formed so as to have a large area. The piezoelectric drive portion 10d expands and contracts in only the longitudinal direction. However, a great force can be applied from the protrusion portion 20 to the driven body (not shown).

As understood from FIGS. 3A, 3B, and 8A to 8C, it is possible to provide at least one electrode layer for the second electrode 150 of the piezoelectric vibrating body 100. However, as the embodiments shown in FIGS. 3A, 3B, 8A, and 8B, when the second electrodes 150 are provided at diagonal positions of the rectangular piezoelectric vibrating body 100, preferably, the piezoelectric vibrating body 100 and the vibrating plate 200 can be formed in meandering shapes which are bent in the planes.

C. Other Embodiments of Device Using Piezoelectric Drive Device

The above-described piezoelectric drive device can apply a great force to the driven body using resonance. Accordingly, the piezoelectric drive device can be applied to various devices. For example, the piezoelectric drive device can be used as drive devices in various apparatuses such as a robot, an electronic component transport apparatus (IC handler), a dosing pump, a calendar transport device of a timepiece, a printing apparatus (for example, a paper feeding mechanism. However, in the piezoelectric drive device used in a head, since the vibrating plate does not resonate, the piezoelectric drive device cannot be applied to the head). Hereinafter, other representative embodiments except for the double-arm robot shown in FIG. 1 will be described.

Figure 9:
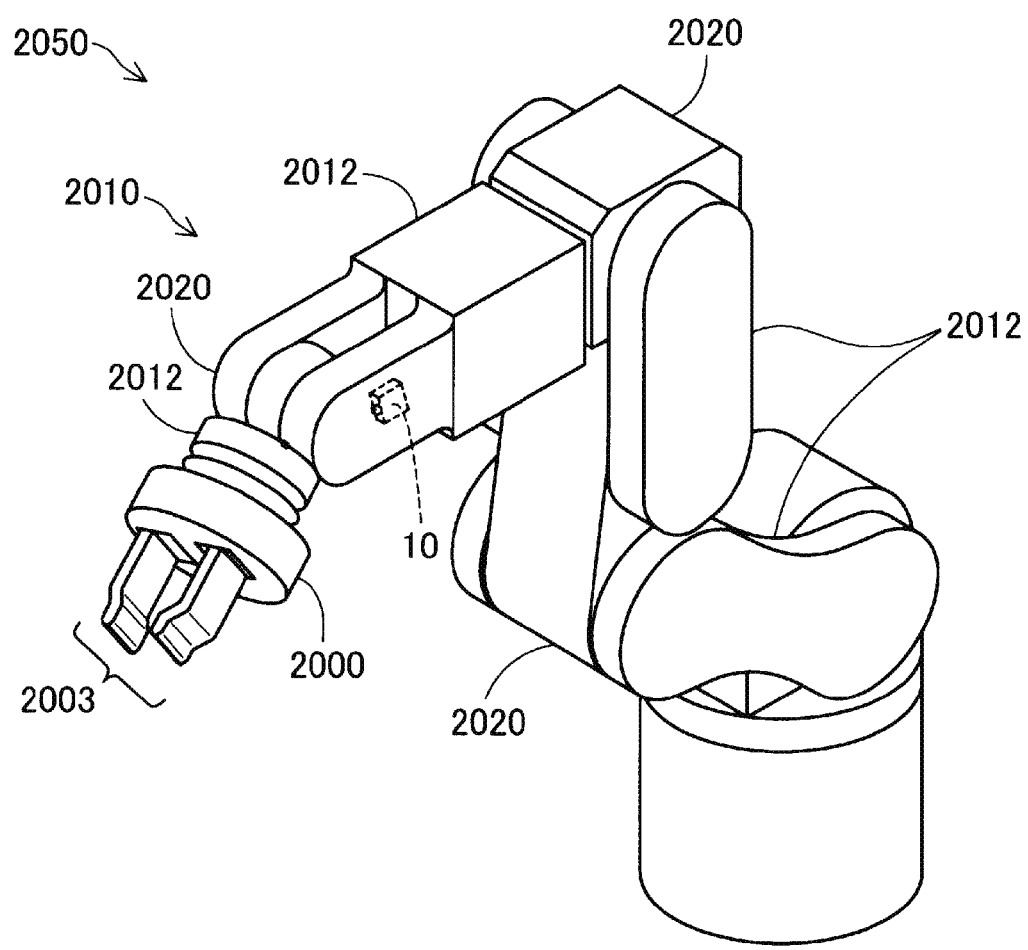
FIG. 9 is an explanatory view showing an example of a single-arm robot which uses the piezoelectric drive device.

FIG. 9 is an explanatory view showing an example of a single-arm robot 2050 which uses the above-described piezoelectric drive device 1300. The single-arm robot 2050 includes an arm 2010 (also referred to as an "arm portion") which includes a plurality of link portions 2012 (also referred to as a "link member"), and a plurality of joint portions 2020 by which the link portions 2012 are connected to each other in a state where the portions between the link portions 2012 can be rotated or bent. The piezoelectric drive portion 10 of the above-described piezoelectric drive device 1300 is built in each joint portion 2020, and the joint portion 2020 can be rotated or bent by an arbitrary angle using the piezoelectric drive portion 10. A robot hand 2000 is connected to the tip of the arm 2010. The robot hand 2000 includes a pair of holding portions 2003. The piezoelectric drive portion 10 is also built in the robot hand 2000, and the holding portion 2003 is opened and closed using the piezoelectric drive portion 10 to hold a material. In addition, the piezoelectric drive portion 10 is also provided between the robot hand 2000 and the arm 2010, and it is possible to rotate the robot hand 2000 with respect to the arm 2010 using the piezoelectric drive portion 10. In addition, the drive circuit 300 which controls each piezoelectric drive portion 10 is included in a control circuit (not shown).

Figure 10:
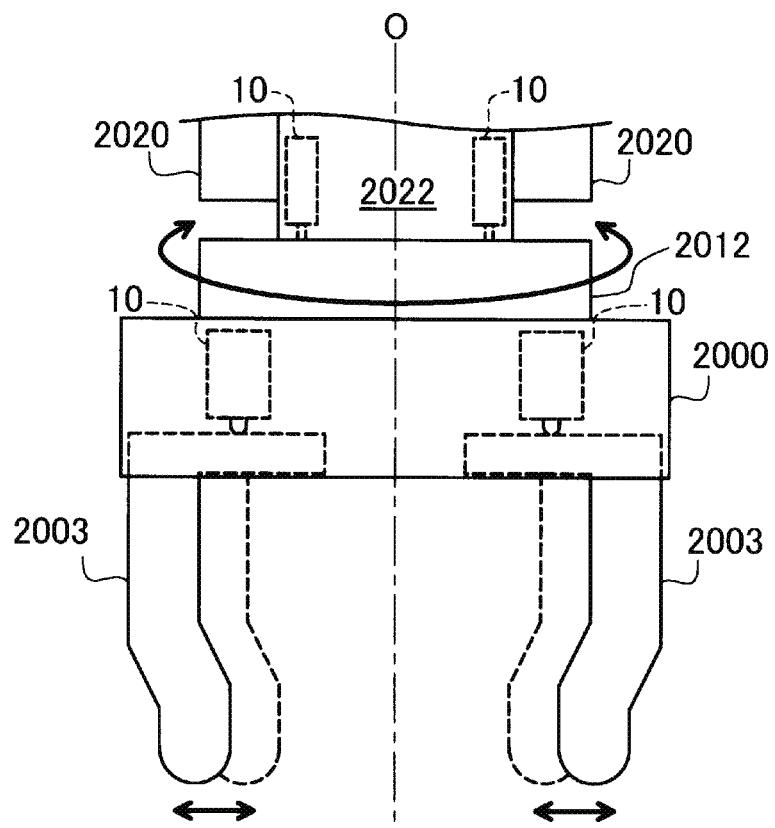
FIG. 10 is an explanatory view of a wrist portion of the single-arm robot.

FIG. 10 is an explanatory view of a wrist portion of the single-arm robot 2050 shown in FIG. 9. A wrist rotation portion 2022 is interposed between wrist joint portions 2020, and the wrist link portion 2012 is rotatably attached to the wrist rotation portion 2022 around a center axis O of the wrist rotation portion 2022. The wrist rotation portion 2022 includes the piezoelectric drive portion 10, and the piezoelectric drive portion 10 rotates the wrist link portion 2012 and the robot hand 2000 around the center axis O. In addition, the wrist rotation portion 2022 may be regarded as one of the plurality of joint portions 2020, and in this case, the wrist joint portion 2020 may be regarded as one of the link portions 2012. The plurality of holding portions 2003 are erected on the robot hand 2000. The base end portion of each holding portion 2003 can move in the robot hand 2000, and the piezoelectric drive portion 10 is mounted on a root portion of the holding portion 2003. Accordingly, the holding portions 2003 are moved by operating the piezoelectric drive portion 10, and it is possible for an object to be held.

Moreover, the robot is not limited to the double-arm robot (FIG. 1) of the embodiment or the single-arm robot of another embodiment. For example, the piezoelectric drive portion 10 may be also applied to a multi-arm robot having three or more arms. Here, in the inner portions of the wrist joint portions 2020 or in the inner portion of the robot hand 2000, in addition to the piezoelectric drive portion 10, electric wires which supply power to various devices such as a force sensor or a gyro sensor, signal wires which transmit signals, and the like are included, and many wires are needed. Accordingly, it is very difficult to dispose wires inside the joint portions 2020 and the robot hand 2000. However, in the piezoelectric drive portion 10 of the above-described embodiments, since it is possible to decrease a driving current thereof than that of a general electric motor or a piezoelectric drive device of the related art, it is possible to dispose the wires in a small space such as the joint portion 2020 (particularly, the joint portion of the tip of the arm 2010) or the robot hand 2000.

Figure 11:
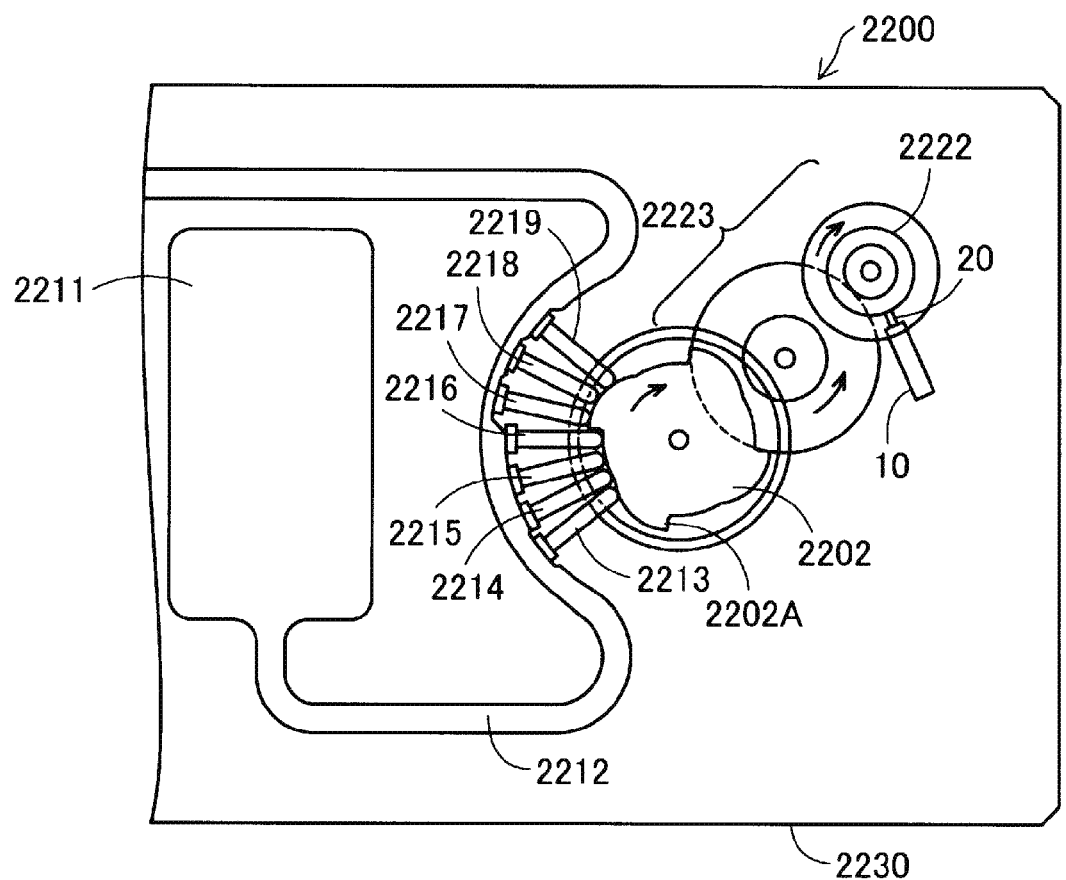
FIG. 11 is an explanatory view showing an example of a liquid feeding pump which uses the piezoelectric drive device.

FIG. 11 is an explanatory view showing an example of a liquid feeding pump 2200 which uses the above-described piezoelectric drive device 1300. In the liquid feeding pump 2200, a reservoir 2211, a tube 2212, the piezoelectric drive portion 10, a rotor 2222, a deceleration transmission mechanism 2223, a cam 2202, and a plurality of fingers 2213, 2214, 2215, 2216, 2217, 2218, and 2219 are provided in a case 2230. In addition, the drive circuit 300 is not shown. The reservoir 2211 is a vessel portion for accommodating a liquid which is an object to be transported. The tube 2212 is a tube for transporting the liquid discharged from the reservoir 2211. The protrusion portion 20 of the piezoelectric drive portion 10 is provided in a state where the protrusion portion 20 is pressed to the side surface of the rotor 2222, and the piezoelectric drive portion 10 rotates the rotor 2222. The rotation force of the rotor 2222 is transmitted to the cam 2202 via the deceleration transmission mechanism 2223. Each of the fingers 2213 to 2219 is a member for closing the tube 2212. When the cam 2202 rotates, the fingers 2213 to 2219 are sequentially pushed outward in a radial direction by a protrusion portion 2202A of the cam 2202. The fingers 2213 to 2219 sequentially close the tube 2212 from the upstream side (the reservoir 2211 side) in the transport direction. Accordingly, the liquid in the tube 2212 is sequentially transported to the downstream side. Therefore, a slight amount of the liquid can be accurately transported, and it is possible to decrease a size of the liquid feeding pump 2200.

In addition, the disposition of each member is not limited to the shown disposition. Moreover, the member such as the finger may not be provided, and a ball or the like provided in the rotor 2222 may close the tube 2212. The liquid feeding pump 2200 may be used in a dosing device which doses a liquid medicine such as insulin to a human body, or the like. Here, by using the piezoelectric drive device 1300 of the embodiment, driving current decreases compared to the piezoelectric drive device of the related art. Accordingly, it is possible to decrease power consumption of the dosing device. Therefore, particularly, when the dosing device is driven by a battery, the piezoelectric drive device 1300 is effective.

D. Modification Example

In addition, the invention is not limited to the above-described examples or embodiments, various aspects can be performed within a scope which does not depart from the gist, and for example, the following modifications may be performed.

(1) In the embodiment, the first electrode 130, the piezoelectric material 140, and the second electrode 150 are formed on the substrate 120. However, the substrate 120 may be omitted, and the first electrode 130, the piezoelectric material 140, and the second electrode 150 may be formed on the vibrating plate 200.

(2) In the embodiment, one piezoelectric vibrating body 100 is provided on each of both surfaces of the vibrating plate 200. However, one of the piezoelectric vibrating bodies 100 may be omitted. However, when the piezoelectric vibrating body 100 is provided on each of both surfaces of the vibrating plate 200, preferably, the vibrating plate 200 is more easily deformed in a meandering shape which is bent in the plane.

(3) In each embodiment, the example in which the piezoelectric material which is formed using a film forming process is used for the piezoelectric element is described. However, the piezoelectric material may be a piezoelectric material in bulk.

(4) In the embodiment, the configuration is described in which the vibrator portion 210 is supported so as to be vibrated by three connection portions 220 which extend from each of right and left long sides of the vibrator portion 210. However, the disposition positions or the number of the connection portions 220 is not limited to this, and various disposition positions or other numbers may be adopted. For example, the connection portions may be provided on only one side along the longitudinal direction, and the vibrator portion 210 may be configured so as to be supported in a cantilever state. Moreover, the connection portions may be provided on the short side opposite to the protrusion portion 20 of the vibrator portion 210, and the vibrator portion 210 may be configured so as to be supported in a cantilever state.

The invention is not limited to the embodiments, examples, modification examples, and various configurations may be realized within a scope which does not depart from the gist of the invention. For example, embodiments and examples corresponding to technical characteristics of each aspect described in Summary of the invention, and technical characteristics of the modification examples may be appropriately replaced or combined in order to solve a portion or the entirety of the problems of the related art or to achieve a portion or the entirety of the effects. In addition, if the technical characteristics are not described as essential elements in the specification, the technical characteristics may be appropriately omitted.

The entire disclosure of Japanese Patent Application No. 2015-062226, filed Mar. 25, 2015 is expressly incorporated by reference herein.

What is claimed is:

1. A piezoelectric drive device, comprising:
a piezoelectric drive member which includes a piezoelectric material and a contact projection that contacts a driven body at a contact position; and
a drive circuit which is configured to drive the piezoelectric drive member,
wherein the drive circuit is configured to drive the piezoelectric drive member with an output torque from allowable maximum output torque Tlim or less within an allowable output torque range so that the drive circuit is configured to set the output torque of the piezoelectric drive member within the allowable output torque range, and
the allowable maximum output torque Tlim is:

$$Tlim = r1 \times \mu k \times Ns \times fs$$

wherein r1 is a distance between a rotation center of the driven body and the contact position, $\mu k$ is a dynamic friction coefficient between the driven body and the contact projection, Ns is a pressing force by which the contact projection presses the driven body when an operation of the piezoelectric drive member stops, and fs is a coefficient of 1 or less.

2. The piezoelectric drive device according to claim 1, wherein the coefficient fs is less than 1.

3. The piezoelectric drive device according to claim 1, wherein load torque applied to the driven body is less than or equal to the allowable maximum output torque Tlim.

4. A robot, comprising:
a plurality of links;
a joint which is connected to the plurality of links; and
a piezoelectric drive device which rotates the plurality of links at the joint, the piezoelectric drive device including:
 a piezoelectric drive member which includes a piezoelectric material and a contact projection that contacts a driven body at a contact position; and
 a drive circuit which is configured to drive the piezoelectric drive member,
wherein the drive circuit is configured to drive the piezoelectric drive member with an output torque from allowable maximum output torque Tlim or less within an allowable output torque range so that the drive circuit is configured to set the output torque of the piezoelectric drive member within the allowable output torque range, and
the allowable maximum output torque Tlim is:

$$Tlim = r1 \times \mu k \times Ns \times fs$$

wherein r1 is a distance between a rotation center of the driven body and the contact position, $\mu k$ is a dynamic friction coefficient between the driven body and the contact projection, Ns is a pressing force by which the contact projection presses the driven body when an operation of the piezoelectric drive member stops, and fs is a coefficient of 1 or less.

5. A driving method of a robot, the robot including:
a plurality of links;
a joint which is connected to the plurality of links;
a piezoelectric drive device which rotates the plurality of links, the piezoelectric drive device including:

a piezoelectric drive member which includes a piezoelectric material and a contact projection that contacts a driven body at a contact position; and a drive circuit which is configured to drive the piezoelectric drive member, wherein the drive circuit is configured to drive the piezoelectric drive member with an output torque from allowable maximum output torque Tlim or less within an allowable output torque range so that the drive circuit is configured to set the output torque of the piezoelectric drive member within the allowable output torque range, and the allowable maximum output torque Tlim is:

$$Tlim = r1 \times \mu k \times Ns \times fs$$

wherein r1 is a distance between a rotation center of the driven body and the contact position, $\mu k$ is a dynamic friction coefficient between the driven body and the contact projection, Ns is a pressing force by which the contact projection presses the driven body when an operation of the plurality of piezoelectric drive member stops, and fs is a coefficient of 1 or less, the driving method comprising:

rotating the plurality of links at the joint by driving the piezoelectric drive device; and setting the output torque of the piezoelectric drive member is equal to or less than the allowable maximum output torque Tlim.

6. A driving method of a piezoelectric drive device, the piezoelectric drive device including:

a piezoelectric drive member which includes a piezoelectric material and a contact projection that contacts a driven body at a contact position; and a drive circuit which is configured to drive the piezoelectric drive member, wherein the drive circuit is configured to drive the piezoelectric drive member with an output torque from allowable maximum output torque Tlim or less within an allowable output torque range so that the drive circuit is configured to set the output torque of the piezoelectric drive member within the allowable output torque range, and the allowable maximum output torque Tlim is:

$$Tlim = r1 \times \mu k \times Ns \times fs$$

wherein r1 is a distance between a rotation center of the driven body and the contact position, $\mu k$ is a dynamic friction coefficient between the driven body and the contact projection, Ns is a pressing force by which the contact projection presses the driven body when an operation of the plurality of piezoelectric drive member stops, and fs is a coefficient of 1 or less, the method comprising:

setting the output torque of the piezoelectric drive member is equal to or less than the allowable maximum output torque Tlim.

\* \* \* \* \*